May 17, 1932.  L. A. SAFFORD  1,858,281
NUT THREADING MACHINE
Filed March 11, 1929  2 Sheets-Sheet 1
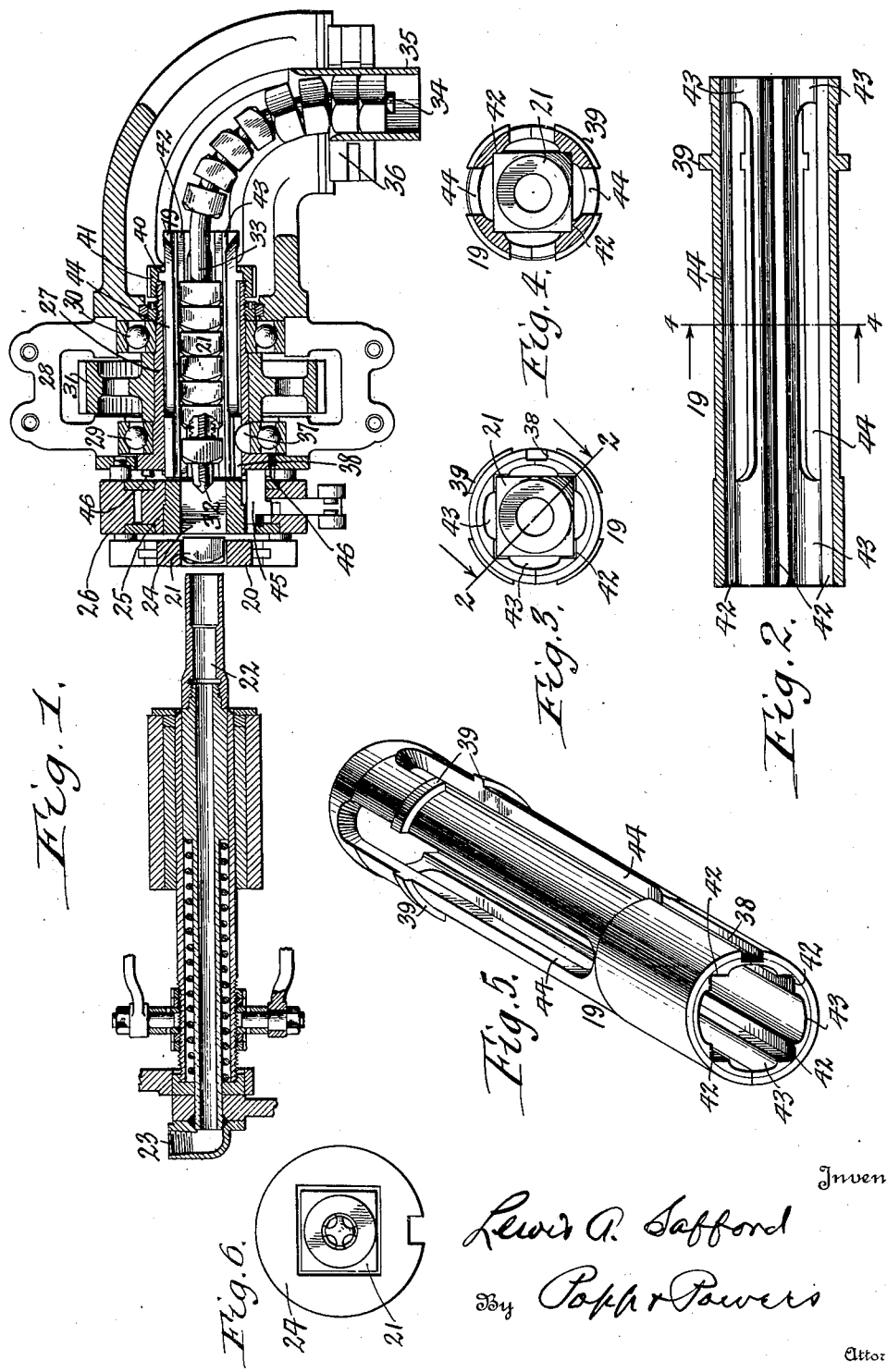
Inventor
Lewis A. Safford
By Popp & Powers
Attorneys May 17, 1932.  L. A. SAFFORD  1,858,281
NUT THREADING MACHINE
Filed March 11, 1929  2 Sheets-Sheet 2
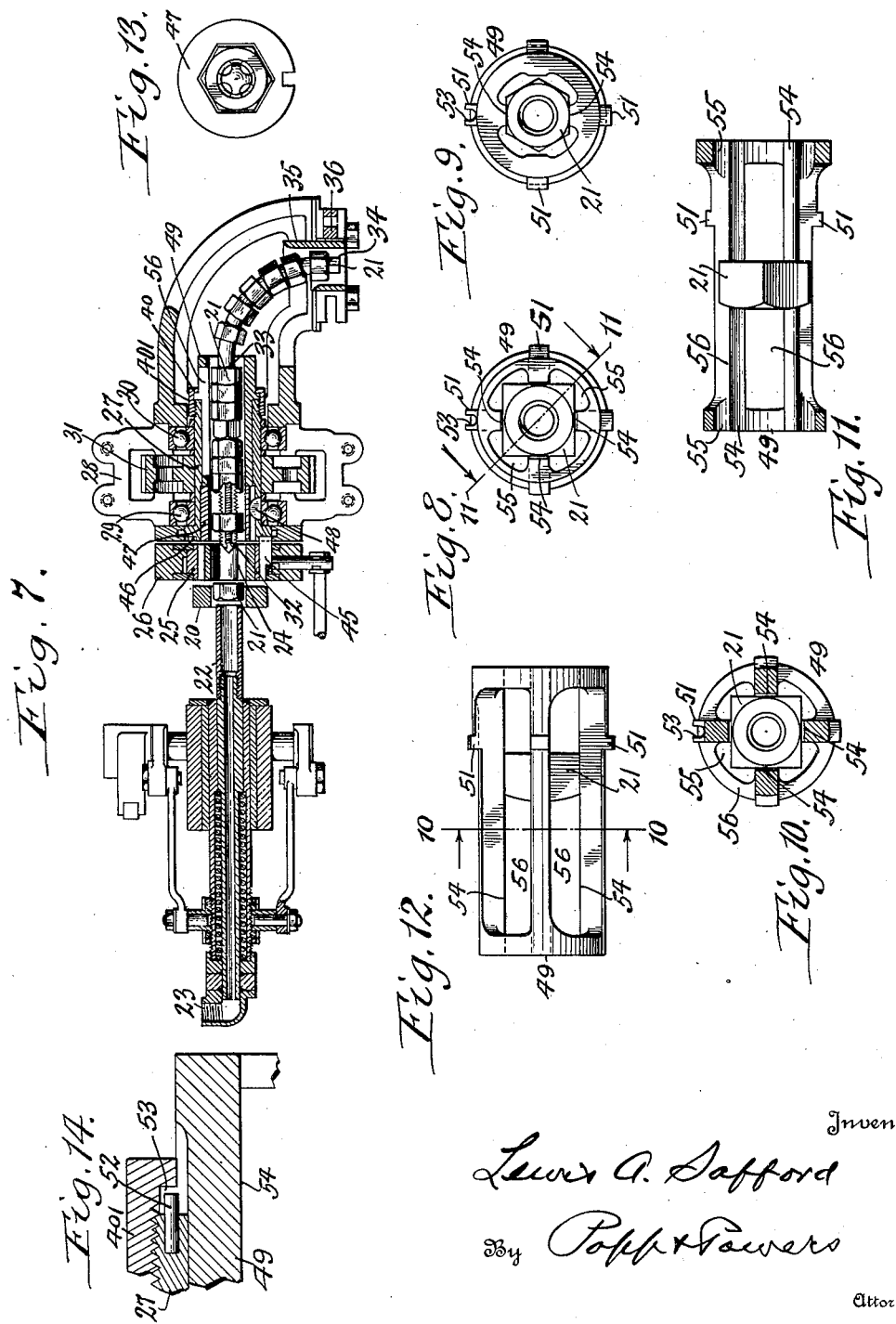
Inventor
Lewis A. Safford
By Popp & Powers
Attorneys Patented May 17, 1932

1,858,281

UNITED STATES PATENT OFFICE

LEWIS A. SAFFORD, OF PHILADELPHIA, PENNSYLVANIA, ASSIGNOR TO AUTOMATIC NUT-THREAD CORPORATION, OF BUFFALO, NEW YORK, A CORPORATION OF NEW YORK

NUT THREADING MACHINE

Application filed March 11, 1929. Serial No. 346,082.

This invention relates to a nut threading machine of the type shown in my pending U. S. patent application Ser. No. 196,680 filed June 6, 1927, and more particularly to the means for rotating and guiding the nuts or nut blanks while the same are moving lengthwise over a tap which cuts an internal screw thread therein.

The means heretofore employed for rotating and guiding the nuts prevented ready escape of the chips formed during the operation of cutting the threads in the nuts; the same also produced objectionable burrs on the nuts which prevented gauging of the same; and the nuts were guided insufficiently so that the same were not finished to close limits as to both pitch diameter and squareness of threads with the faces of the nuts.

It is therefore the object of this invention to provide means for rotating and guiding the nuts or nut blanks as the same pass through the rotary spindle and over the stationary tap, whereby the nuts are accurately guided and free escape of the chips and the coolant used in the threading operation is possible, so that the nuts can be readily fed through the spindle with moderate pressure without liability of forming objectionable burrs thereon and still finish the nuts so that the threads are held to close limits both as to pitch diameter and square with the face of the same.

In the accompanying drawings:—

Figure 1 is a fragmentary longitudinal section of a nut threading machine embodying my improvements.

Figure 2 is a similar view, on an enlarged scale, of the rotating and guiding bushing or sleeve, taken on line 2—2 Fig. 3.

Figure 3 is a front end view of the bushing showing the same adapted to threading square nuts.

Figure 4 is a cross section of the same taken on line 4—4 Fig. 2.

Figure 5 is a perspective view of the bushing shown in Figs. 1-4.

Figure 6 is a front view of the adapter of the registering device.

Figure 7 is a view similar to Fig. 1 but showing a modified form of my invention.

Figure 8 is a front end view of the bushing showing the bushing adapted for threading square nuts.

Figure 9 is a similar view showing the bushing adapted for threading hexagonal nuts.

Figure 10 is a cross section on line 10—10 Fig. 12.

Figure 11 is a longitudinal section on line 11—11 Fig. 8.

Figure 12 is a side view of the bushing shown in Fig. 7.

Figure 13 is a front view of the front bushing shown in Fig. 7.

Figure 14 is a fragmentary longitudinal section on an enlarged scale of the key means for compelling the rear bushing and spindle shown in Fig. 7 to turn together.

In the following description similar characters of reference indicate like parts in the several figures of the drawings.

Referring to Figs. 1 to 5, the numeral 20 represents an upright magazine or holder which is adapted to contain a supply of screw nut blanks 21 which are adapted to be internally threaded, and from the lower end of which the lowermost nut in the magazine or holder is discharged from the rear side of the latter by means of a horizontally reciprocating plunger 22, which latter may be actuated in any suitable manner but preferably by the means which are shown in the application for patent above referred to.

This plunger is hollow and connected at its rear end with a coupling 23 whereby a lubricating and cooling liquid is adapted to be supplied to the plunger for delivery to the mechanism which operates to cut a screw thread in the nut, and thereby not only lubricate the tool during this cutting operation but also reduce the temperature of this tool and the nut which is being operated upon, and also wash out the chips removed from the nuts.

In rear of the magazine or holder 20 is arranged a registering device which is adapted to receive the nuts successively from the magazine and present them in the proper position to the screw threading mechanism which is arranged in rear of this registering device. This registering device forms no part of the present invention and therefore may be of any suitable construction but the same is preferably constructed and operated in the manner set forth in said patent application Ser. No. 196,680, and in its general organization the same comprises a rotary adapter 24 of tubular form and preferably the same in cross section as the nut, so that when a nut is pushed into the same the latter will be compelled to turn with the said adapter preparatory to presenting the nut in correct register with the threading devices which subsequently operate on the nut. This adapter is mounted within a supporting ring 25 which is journaled in a suitable bearing in the adjacent part 26 of the frame of the machine.

In rear of this registering device is arranged the hollow rotary spindle 27 of a chuck which is adapted to receive the nut to be threaded and turn the same while the nut is being moved lengthwise over the means whereby a thread is cut therein. This rotary spindle is journaled on the adjacent part 28 of the main frame preferably by means of ball bearings 29 and 30, and the same is rotated by a driving mechanism which preferably includes a gear wheel 31 secured to the periphery of this spindle between said bearings 29 and 30, as shown in Fig. 1.

Within the bore of this spindle is arranged the means whereby the screw nuts are compelled to rotate with the spindle and also guided from the front end to the rear end of the same while the thread is being cut in the bore of the nut.

The means whereby the thread is cut in the nuts preferably consists of a tap having a front cutting section 32 arranged axially within the front part of the nut rotating and guiding means, a straight intermediate shank portion 33 arranged axially within the rear part of these nut rotating and guiding means and a laterally bent or curved discharge shank portion 34 terminating in a laterally projecting tubular guide 35 arranged on the adjacent part 36 of the main frame.

The screw nuts are forced by the plunger 22 from the magazine 20 into the adapter 24 of the registering device and each nut is successively pushed rearwardly out of the adapter on to the threaded portion of the tap, thence over the straight intermediate part 33 of the shank thereof, and then delivered from the laterally bent rear end 34 thereof into the guide sleeve 35, from which latter the finished nuts are discharged and received by any suitable means provided for that purpose.

The rotating and guiding means for the screw nut, which surround the threaded front section and the intermediate straight part of its shank, serve to compel the nut to rotate with the chuck spindle 27 and also to guide the nuts lengthwise of the tap and its shank during this movement.

Heretofore the means employed for this purpose were liable to become clogged with chips which were cut from the nuts during the threading operation. Unsufficient lubrication and cooling of the parts was also liable to occur and the nuts would not always be finished to close limits so far as pitch diameter and the squareness with the face of the same was concerned. Moreover the last thread cut on the screw blanks was apt to be burred and thereby not only prevent the passing of a gauge through the same, but also render the same unsatisfactory for all uses.

The nut rotating and guiding means forming the subject of this application are therefore intended to overcome the difficulties and objections just enumerated.

As shown in Figs. 1-5, these nut rotating and guiding means preferably comprise a bushing, sleeve or tubular member 19 which is made up of two like semi-cylindrical sections which are introduced in an assembled form into the spindle 27 from the rear end thereof and are compelled to turn therewith by means of a key 37 mounted on the spindle 27 and engaging with a key-way 38 in the front part of the periphery of said bushing. This bushing is secured to the spindle so as to be held against longitudinal movement thereon by engaging the front side of circumferential lugs 39 on the rear part of the periphery of this bushing with the rear end of the spindle 27 and engaging the rear sides of these lugs 39 by an internal forwardly facing shoulder 40 formed on the clamping sleeve 41 which is secured by means of a screw joint with the rear end of the spindle 27, as shown in Fig. 1.

The bore of this nut rotating and guiding bushing is provided with a plurality of longitudinal lands 42 which are adapted to engage with some parts of the periphery of each of the nuts as it is being moved lengthwise over the cutting portion of the tap and the adjacent part of its shank, and also with a plurality of longitudinal channels which alternate with said lands and which form passageways along other parts of the peripheral surfaces of the nuts which are being cut from the nut blank, and also provide sufficient clearance for the flow of the coolant lengthwise along the nuts for washing out the chips and keeping the heated parts cool.

In the construction shown in Figs. 3, 4 and 5 the lands in the bushing are made of angular form in cross-section so as to receive the corners on the periphery of the square nuts, and thereby compel the latter to turn with the bushing and the spindle during the operation of the machine while the nut is engaging with the front cutting section of the tap, and thereby enabling the latter to form a thread on the nut.

In the construction shown in Figs. 2–5, the chip clearance and coolant conducting channels which alternate with the lands have their front and rear ends constructed in the form of longitudinal grooves 43, and the intermediate parts of these channels which are arranged between the end grooves 43 have the form of slots 44 which extend from the bore of the bushing to the periphery thereof.

The bushing is preferably of such length that the rear end of the same extends rearwardly beyond the rear end of the spindle 27 for a sufficient distance to uncover the outer or peripheral sides of the slots 44 in rear of the spindle.

It follows from this construction that when the screw nuts are moved lengthwise of the front thread-cutting tap 32 and the straight intermediate portion 33 of its shank that these nuts are compelled to turn by engagement of the corners of the nuts with the lands 42 of the bushing, and these lands also serve as guides for the nuts during their longitudinal movement through the spindle from the front to the rear end thereof. At the same time that the nuts are being thus rotated and moved lengthwise through the bushing the coolant which is supplied by the hollow plunger 22 is discharged rearwardly through the channels of the bushing so that the coolant washes out the chips which are removed from the nuts during the threading operation thereon, such chips being discharged not only longitudinally rearward through the rear internal grooves 43 of the bushing, but also laterally through the exposed or uncovered rear parts of the slots 44 of the bushing, thereby causing the chips to be removed promptly from the bushing and preventing interference with the threading operation and the movement of the nuts through the bushing.

It is therefore possible by these means to guide the nuts more accurately and reliably as they are moving through the spindle and over the threading tap and thereby enable the thread to be cut more accurately so far as close limits of its pitch diameter are concerned, and also insuring closer limits as to the squareness of the threads relative to the faces of the nuts. Due to the more effective washing action of the coolant upon the chips which are removed from the nuts and the prompt discharge of the same from the bushing, interference of the chips with the working of the machine in its threading operation on the nuts is avoided.

During the time that a screw nut 21 is fed from the magazine 20 to the adapter 24 of the registering mechanism, the latter is held at rest, but while the screw nut is being transferred from the adapter 24 of the registering mechanism to the tap and the bushing of the rotary chuck, this adapter and the bushing are caused to turn together by a mechanism which is substantially the same as that shown in the pending application above referred to, and which consists generally of a coupling dog or latch 45 mounted on the supporting ring of the adapter and movable into and out of engagement with shoulders 46 formed in the front face of the rotary spindle 27, as shown generally in Fig. 1.

Instead of extending the bushing the full length of the rotary spindle the same may be made somewhat shorter so as to occupy only the rear part of the spindle, while the front part of the spindle is occupied by a separate front bushing section 47, as shown in Fig. 13. The cross section of this front bushing section 47 is, however, connected with the spindle by means of a key or spline 48 and insertable through the front end thereof, while the rear bushing section 49, which embodies the present invention, is insertable into the spindle from the rear end thereof and held against longitudinal movement relative thereto by means of a clamping sleeve 401 engaging with lugs or flange sections 51, and pressing the same against the rear end of the spindle 27 in the same manner in which this is done in the construction shown in Figs. 1–5. The bushing 49 is also held against rotation by means of a dowel or pin 52 projecting rearwardly from the rear end of the spindle 27 and engaging with a notch or recess 53 in one of the stop lugs 51, as shown in Fig. 14.

The bore of the jaw 47 is made of prismatic or flat-sided form to conform to the shape of the periphery of the nut which is to be tapped, so that when this nut is pushed into this jaw the nut will be compelled to turn with the spindle of the jaw. Within the bore of the rear rotating and guiding bushing 49 a plurality of longitudinal lands 54 are provided which in this instance are made in the form of longitudinal ribs which project inwardly and are adapted to engage with the flat faces of the nuts which are adapted to be tapped or internally threaded, and thereby compel each nut to turn with this bushing while being guided lengthwise through the bushing during its passage from the front end to the rear end thereof and over the adjacent part of the tap and its shank.

In Figs. 8, 10, 11 and 12 four of such internal lands or ribs 54 are provided within the bore of the bushing so that the same can engage with the four sides of a square nut, but the number of lands may be varied as shown for instance in Fig. 9, in which two lands only are shown for engagement with the diametrically opposite flat sides or faces on the periphery of a hexagonal nut.

Alternating circumferentially with the lands, the bore of the bushing is provided with clearance channels which are arranged opposite other parts of the periphery of the nuts which are being tapped or threaded so as to provide clearance spaces or passages which are adapted to receive the chips formed during the operation of threading the nuts, and also enable the coolant flowing through the bushing to effectively discharge these chips from the bushing.

Each of these channels preferably consists of longitudinal grooves 55 formed at the front and rear ends of the bore of the bushing 49, and an intermediate longitudinal slot 56 extending radially from the bore of this bushing to the periphery thereof. In the assembled position of the parts the bushing 49 projects rearwardly beyond the rear end of the spindle 27 to such an extent that the rear ends of the slots 57 are uncovered by the rear end of the spindle and the clamping sleeve 40¹, as shown in Fig. 7, so that the coolant and the chips which are cut from the nuts can escape not only rearwardly through the rear grooves 55 but also radially outward through the rear parts of the slots 56, thereby preventing these chips from becoming clogged in the bushing and interfering with the tapping operation or the movement of the nuts, but instead permitting the threading operation to proceed without hindrance, and the coolant to flow freely for producing the necessary cooling, lubricating and chip-clearing function.

Due to the use of these clearance channels within the bushing opposite some parts of the faces of the nuts which are being tapped in order to permit the escape of the chips and the passage of the coolant, it is permissible to closely engage the lands of the bushing with other parts of the periphery of the screw nuts, so as to rotate the nuts and guide them lengthwise through the bushing without permitting undue play between these nuts and the bushing, thereby securing greater accuracy in the work on the product.

In the construction of the bushing, as shown in Figs. 7–14, the same is made in one piece, but if desired the same can be made of two semi-cylindrical sections, as shown in Figs. 1–5, which last-mentioned construction can be machined more readily.

In the construction shown in Figs. 1–5 it is also preferable to form the key-way 38 partly on the opposing edges of the two bushing sections adjacent to the front end thereof, so that this key-way extends across the joint between these sections, which construction is simpler and capable of being manufactured more easily and at less cost.

I claim as my invention:—

1. A nut threading machine comprising a rotary hollow spindle, a rotating and guiding bushing which is mounted in said spindle and through which the nuts to be threaded move lengthwise and which is provided internally with a plurality of longitudinal lands adapted to be engaged by some parts of the peripheral face of the nuts and a plurality of longitudinal channels arranged opposite other parts of the peripheral face of said nuts, and a tap which is arranged lengthwise within said bushing and over which said nuts are moved lengthwise while being threaded, said channels extending from the bore of the bushing to the periphery thereof and terminating beyond the rear end of said spindle whereby the front parts of said channels are closed on their outer sides by the bore of said spindle and the rear parts of said channels are not covered on their outer sides by said spindle, and thereby causing the chips removed from the nuts to pass rearwardly in said channels and thus escape laterally therefrom at the rear end of said spindle.

2. A nut threading machine comprising a rotary hollow spindle, a bushing mounted in said spindle to turn therewith and provided internally with a plurality of longitudinal lands forming guides which are adapted to be engaged by some parts of the peripheral face of the nuts which are being threaded and also with longitudinal clearance channels alternating with said lands and arranged opposite other parts of the peripheral face of said nuts, the end parts of the said channels having the form of internal grooves in the end parts of the bore of said bushing, and the central parts of said channels between the ends thereof having the form of slots which extend from the bore of the bushing to the periphery thereof, and a screw threading tap arranged in the bushing and adapted to be engaged by the nuts to be tapped.

3. A nut threading machine comprising a rotary hollow spindle, a bushing mounted in said spindle to turn therewith and provided internally with a plurality of longitudinal lands forming guides which are adapted to be engaged by some parts of the peripheral face of the nuts which are being threaded and also with longitudinal clearance channels alternating with said lands and arranged opposite other parts of the peripheral face of said nuts, the end parts of said channels having the form of internal grooves in the end parts of the bore of said bushing and the central parts of said bushing, and the central parts of said channels between the ends thereof having the form of slots which extend from the bore of the bushing to the periphery thereof, and a screw threading tap arranged in the bushing and adapted to be engaged by the nuts to be tapped, the rear end of said bushing extending beyond the rear end of said spindle so as to uncover the rear parts of said slots on the periphery of the bushing and permit chips from the nuts to escape laterally therethrough as well as from the rear ends of said grooves.

4. A nut threading machine comprising a rotary hollow spindle, a bushing mounted in said spindle to turn therewith and provided internally with a plurality of longitudinal lands forming guides which are adapted to be engaged by some parts of the peripheral face of the nuts which are being threaded and also with longitudinal clearance channels alternating with said lands and arranged opposite other parts of the peripheral face of said nuts, the end parts of said channels having the form of internal grooves in the end parts of the bore of said bushing, and the central parts of said channels between the ends thereof having the form of slots which extend from the bore of the bushing to the periphery thereof, and a screw threading tap arranged in the bushing and adapted to be engaged by the nuts to be tapped, the rear end of said bushing extending beyond the rear end of said spindle so as to uncover the rear parts of said slots on the periphery of the bushing and permit chips from the nuts to escape laterally therethrough as well as from the rear ends of said grooves, and said bushing being divided lengthwise and diametrically into two semi-cylindrical sections, said sections being provided at the joint between them with a key-way adapted to receive a key on the spindle.

In testimony whereof I hereby affix my signature.

LEWIS A. SAFFORD.